Jan. 20, 1970 | R. M. COX ET AL | 3,491,319

DIGITAL ACTUATOR

Filed Aug. 29, 1967 | 4 Sheets-Sheet 1

INVENTORS
ROBERT M. COX
CLYDE F. CZERNEK
KENNETH E. TURNER
BY Fulwider, Patton, Rieber
Lee, and Utecht
ATTORNEYS

DIGITAL ACTUATOR

Filed Aug. 29, 1967 4 Sheets-Sheet 2

INVENTORS
ROBERT M. COX
CLYDE F. CZERNEK
KENNETH E. TURNER
BY
Fulwider, Patton, Rieber, Lee, and Utecht
ATTORNEYS

DIGITAL ACTUATOR

Filed Aug. 29, 1967 4 Sheets-Sheet 3

INVENTORS
ROBERT M. COX
CLYDE F. CZERNEK
BY KENNETH E. TURNER
Fulwider, Patton, Rieber
Lee, and Utecht
ATTORNEYS Jan. 20, 1970 R. M. COX ET AL 3,491,319

DIGITAL ACTUATOR

Filed Aug. 29, 1967 4 Sheets-Sheet 4

INVENTORS
ROBERT M. COX
CLYDE F. CZERNEK
BY KENNETH E. TURNER
Fulwider, Patton, Rieber
Lee, and Utecht
ATTORNEYS United States Patent Office 3,491,319

Patented Jan. 20, 1970

3,491,319

DIGITAL ACTUATOR

Robert M. Cox, Northridge, Clyde F. Czernek, Sepulveda, and Kenneth E. Turner, Woodland Hills, Calif., assignors to Servo Labs, Inc., Van Nuys, Calif., a corporation of California Filed Aug. 29, 1967, Ser. No. 664,013

Int. Cl. H01f *7/16*

U.S. Cl. 335—259 10 Claims

ABSTRACT OF THE DISCLOSURE

An electromechanical digital actuator device in which a plurality of coaxial and abutting piston adder assemblies in a columnar stack are selectively expanded and contracted to physically displace an output shaft in accordance with the real value of digital input commands. Each piston adder assembly includes a pair of cylindrical elements normally held in expanded, spaced apart relationship by a coil spring to project one end of the assembly into engagment with a next adjacent adder assembly, whereby the latter adder assembly is spaced from the former assembly by a precisely controlled distance proportional to the real value of the digital command represented by the former assembly. Selective contraction of designated adder assemblies is accomplished by solenoid action whereby magnetic fields are established by coaxial electrically energized coils to contract the cylindrical elements of selected individual adder assemblies. A coaxial coil spring follows up contraction of individual adder assemblies by subsequent like contraction of the entire adder piston stack and corresponding displacement of the output shaft. Means are also provided, by way of selection of material, shape and location of parts, whereby the paths of the magnetic fields are controlled and thermally induced displacement errors are minimized.

BACKGROUND OF THE INVENTION

This invention relates generally to digital actuators wherein a digital input signal is converted to a unique physical output displacement proportional to the real value of the digital input. More particularly, this invention relates to a new and improved digital actuator of the piston adder type.

In recent years there has been an increasing trend toward the use of control systems and the like which utilize information in digital form. Consequently, there has been an attendant increase in the need for high precision digital actuators capable of producing an output displacement proportional to a digital input, e.g., as in a process control valve system using digital input signals to regulate the flow.

Such digital actuation can be accomplished by a wide variety of electrical mechanical, pneumatic and hydraulic mechanisms. While hydraulic systems have acquired some popularity because of their relatively high speed and durability in comparison with some other types of digital actuation mechanisms, such systems usually require a cumbersome and expensive hydraulic power supply and are relatively complex in their structural arrangement as opposed to o'her digital actuation mechanisms.

In an effort to reduce cost, complexity and size, it has been proposed that a solenoid type of actuation mechanism may be employed to move loads in accordance with digital commands. However, such an electromechanical arrangement utilizing solenoids presents a number of thermal and reliability problems. In this regard, since the solenoid would normally be required to move the entire load mass directly, high solenoid coil currents must be sustained over a relatively long position adjustment time interval, with the result that the size and duty cycle requirements of the solenoids and actuating system are rather severe.

Hence, those concerned with the development and use of digital actuator devices have long recognized the need for an improved digital actuator capable of satisfying the precision and durability requirements of modern control systems with high reliability and a minimum of cost and complexity. The present invention fulfills this need.

SUMMARY OF THE INVENTION

Briefly, and in general terms, the present invention provides a new and improved electromechanical digital actuator construction including a plurality of cooperating actuator sections wherein individual actuator sections are selectively expanded and contracted by electromagnetic means to induce cumulative physical displacement of a load mass in accordance with the real value of digital input commands. In accordance with the invention, actual movement of the load mass after selective expansion and contraction of individual actuator sections is accomplished by follow-up motive means, independent of the electromagnetic means for adjusting individual actuator sections.

In a presently preferred arrangement, by way of example and not by way of limitation, the present invention finds particular application in the provision of a digital actuator device in which a plurality of coaxial and abutting piston adder assemblies are arranged in a columnar stack. Each piston adder assembly includes a pair of coaxial cylindrical elements slidable relative to each other along their common axis. These elements are normally held in expanded, spaced apart relationship by resilient means to project one end of the adder assembly into engagement with a next adjacent adder assembly, whereby the latter adder assembly is spaced from the former assembly by a precisely controlled distance proportional to the real value of the digital command represented by the former assembly. Selective contraction of designated adder assemblies is accomplished electromagnetically by coaxial solenoid coils one for each piston adder assembly, of sufficient size to override the resilient means which normally holds a particular pair of adder elements in the expanded state. In this regard, the requirements of the solenoid from the standpoint of size and duty cycle are determined solely by the requirement that its associated piston adder assembly mass must be moved against the resilient means holding that particular adder assembly in the expanded state, as opposed to moving the much larger load mass and all or part of the additional mass of the adder assembly stack. Hence, the size and power requirements of the individual solenoid coils are significantly reduced, with consequent improvement in durability and reliability, as well as a reduction in complexity, system mass and cost.

Additional follow-up motive means, typically in the form of additional resilient means, follows up contraction of individual adder assemblies by like contraction of the entire adder piston stack with corresponding displacement of the output shaft and load mass. Hence, actuator action is essentially accomplished in two phases, the first phase involving displacement only of individual, relatively low mass, adder assemblies, with the second phase involving a slower follow up displacement of the much larger remainder of the system mass including the load itself.

The preferred arrangement may also use various combinations of heat insulating and expansion sleeves to stabilize and compensate the system against thermally induced displacement errors.

BRIEF DESCRIPTION OF THE DRAWING

The above and other advantages of the present invention will become apparent from the following more detailed description, when taken in conjunction with the accompanying drawings of illustrative embodiments thereof, and wherein.

DESCRIPTION OF THE PREFERRED EMBODIMENTS

Figures 1, 2:
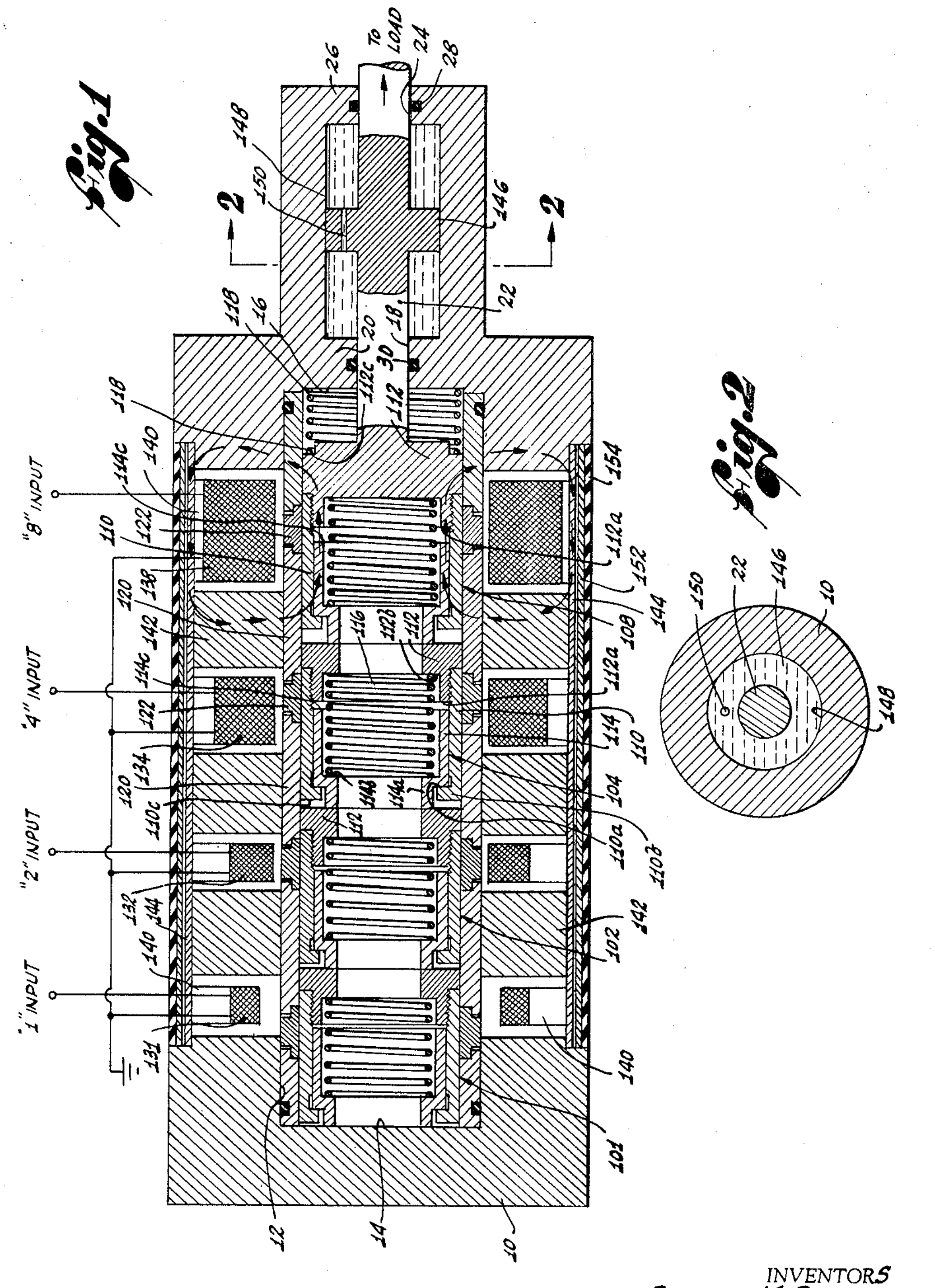
FIGURE 1 is a longitudinal sectional view of a presently preferred embodiment of a digital actuator, in accordance with the present invention.
FIGURE 2 is a sectional view through the actuator of FIGURE 1, taken substantially along the line 2—2 in FIGURE 1.

Referring now to the drawings, and particularly to FIGURE 1 thereof, there is shown a presently preferred embodiment of an electromagnetic digital actuator embodying the principles of the present invention.

The digital actuation system includes a block 10 fabricated of a strong ferromagnetic material, typically mild steel or the like. The block 10 is provided with a centrally located, cylindrical main bore 12 which extends along the central longitudinal axis of the block for a distance which is a major portion of the entire length of the block. The bore 12 is closed at one end 14 and is open at its opposite end 16, the opening being provided by a cylindrical passage 18 in an end wall 20 to enable an output displacement shaft 22 to exit from the main bore. This shaft 22 is coupled to any appropriate load mass (not shown).

A plurality of cylindrical piston adder assemblies 101, 102, 104 and 108, representing the digital quantities "1," "2," "4," and "8," respectively, are slidably mounted within the bore 12 in coaxial alignment therewith.

All of the piston adder assemblies 101, 102, 104 and 108 are in end-to-end abutment within the bore 12 to form a series, columnar stack arrangement, and each piston adder assembly is capable of selective contraction and expansion to produce an incremental physical displacement of all of the remaining adder assemblies ahead of its leading end (to the right in FIGURE 1) which is proportional to the real value of the digital input quantity represented by the particular piston adder assembly producing the displacement. In this connection, each of the piston adder assemblies 101, 102, 104 and 108 is capable of producing an incremental output displacement proportional to each of the digital inputs "1," "2," "4" and "8," respectively. Hence, the pison adder assemblies within the bore 12 of the block 10 together provide an incrementally extendable and retractable actuator column for selectively positioning the output shaft 22 which is affixed to and extends from the last adder assembly 108.

Considering the piston adder assembly 104, by way of example, each adder assembly comprises an outer cylindrical sleeve 110, a cylindrical end cap 112 in threaded engagement with the sleeve 110 at the leading end thereof, and a cylindrical plunger 114 within the sleeve. The plunger 114 is in sliding engagement with the sleeve 110 and is confined within the sleeve for movement between a face 112*a* of the cap 112 at the leading end of the sleeve and a face 110*a* provided by an integral flange 110*b* at the trailing end of the sleeve.

The plunger 114 includes a reduced diameter portion 114*a* at its trailing end which defines a shoulder 114*b*. Resilient means in the form of a coaxial coil spring 116, typically exerting a substantially constant axially directed force of 10 pounds, extends between the plunger shoulder 114*b* and a confronting shoulder 112*b* defined in the end cap 112. Hence, the spring 116 normally biases the plunger 114 against the face 110*a* of the sleeve 110 to maintain the plunger in spaced apart relationship from the face 112*a* of the end cap 112. This defines the expanded state for the adder assembly 104.

For displacement purposes in the piston adder actuator column, the reduced diameter portion 114*a* of the plunger 114 projects beyond the rearmost face 110*c* of the sleeve 110 when the adder assembly is in its expanded state. In this regard, when the adder assembly 104 is in the expanded state, the trailing end of the plunger 114 engages the leading end of the next adjacent adder assembly 102 defined by the forward face of the latter assembly's end cap 112. In this manner, the two adder assemblies 102 and 104 are spaced apart by a distance which is equal to the distance that the plunger portion 114*a* projects beyond the rear face 110*c* of the adder assembly 104, the latter distance being critical and defining the stroke length of the particular piston adder assembly. This stroke length is proportional to the real value of the digital input quantity represented by the particular piston adder assembly and, in the case of the adder assembly 104, is proportional to the digital input "4."

The space between the leading end face 114*c* of the plunger 114 and the confronting face 112*a* of the cap 112 is not critical, but must be equal to or greater than the stroke length of the particular adder assembly. This is a necessary structural requirement to insure that, upon collapse of the adder assembly, the plunger 114 will be completely retracted within the sleeve 110, and no portion of the plunger will project beyond the rearmost face 110*c* of the sleeve.

All of the remaining piston adder assemblies 101, 102 and 108 are identical in their basic structural configurations with the aforedescribed piston adder assembly 104, the primary differences between the assemblies being in their respective piston adder stroke lengths so that each adder assembly is capable of producing a unique incremental output displacement proportional to the real value of the digital quantity represented by that particular adder assembly. In addition, the end cap 112 of the last adder assembly 108 is physically connected in any appropriate manner to the output displacement shaft 22 which drives the load.

Resilient means in the form of a coaxial coil spring 118 extends between the end wall 16 of the main bore 12 and a seating shoulder 112*c* formed in the forward face of the end cap 112 for the adder assembly 108. The spring 118 exerts an axially directed biasing force against the adder assembly actuator column which tends to contract the column. However, the magnitude of the force applied by the spring 118, typically 5 pounds, must be less than the magnitude of the force applied by each of the individual adder assembly springs 116 which normally maintain each of the adder assemblies in the expanded state. Hence, the function of the spring 118 is not to collapse or contract the individual adder assemblies, but rather to provide follow up contraction of the remainder of the actuator column, with corresponding displacement of the output shaft 22 and load mass, after individual adder assemblies have been selectively collapsed electromagnetically in the manner to be subsequently described.

It will be apparent in FIGURE 1 that the leading end of each piston adder assembly in the columnar stack positions the trailing end of the adder assembly directly ahead of it, with the exception of the adder assembly 108 which positions the output shaft 22. Hence, the displacement of the output shaft 22 along the main bore 12, relative to a zero position wherein all of the piston adder assemblies are fully expanded, is always equal to the sum of the incremental displacements provided by every collapsed adder assembly. In this regard, the maximum displacement which the digital actuation system is capable of providing is equal to the cumulative sum of all of the adder assembly stroke lengths or, for the specific case illustrated in FIGURE 1, a physical displacement proportional to the real value of a digital input "15."

Of course, it will be appreciated that, while the digital actuator of the present invention has been illustrated for four adder assemblies capable of producing an output displacement proportional to the real value of any digital input between "0" and "15," the system can be readily modified to increase or decrease the number of piston adder assemblies in series and to thereby increase or decrease, respectively, the range of incremental output displacements which the system is capable of producing.

Figure 3:
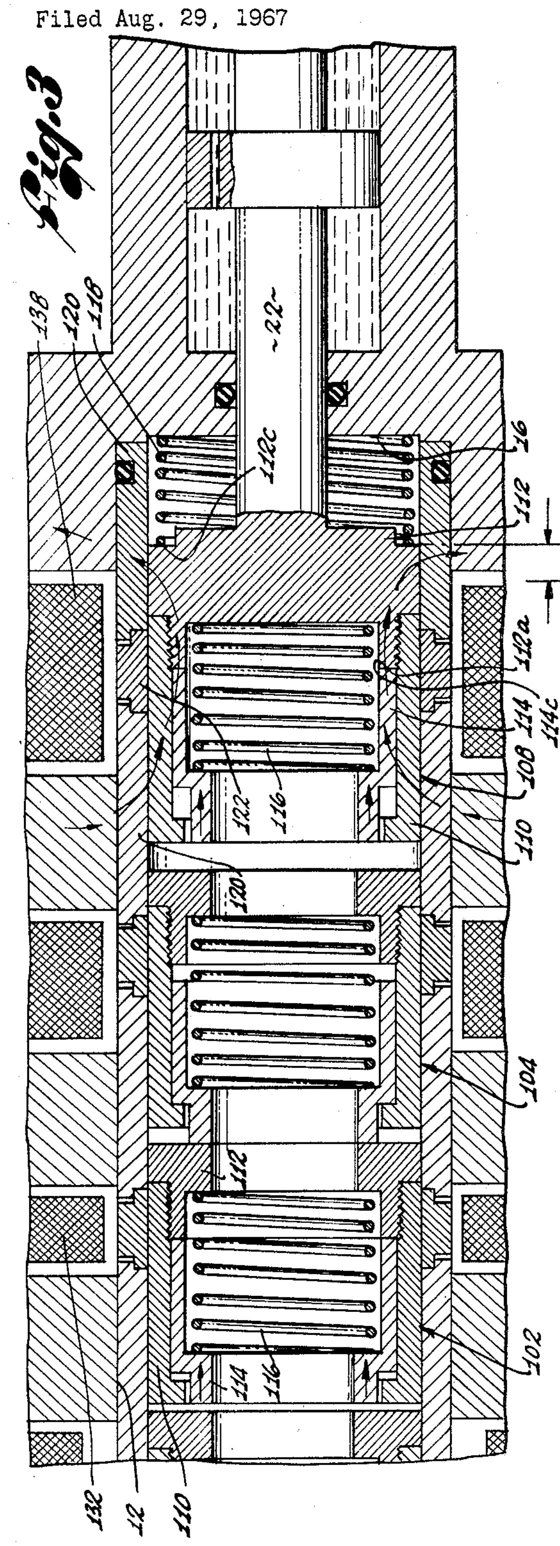
FIGURES 3 and 4 are enlarged, fragmentary sectional views of the digital actuator of FIGURES 1 and 2, illustrating the manner in which a single piston adder assembly is collapsed with consequent follow up displacement of the adder assembly stack and the load mass.
Figure 4:
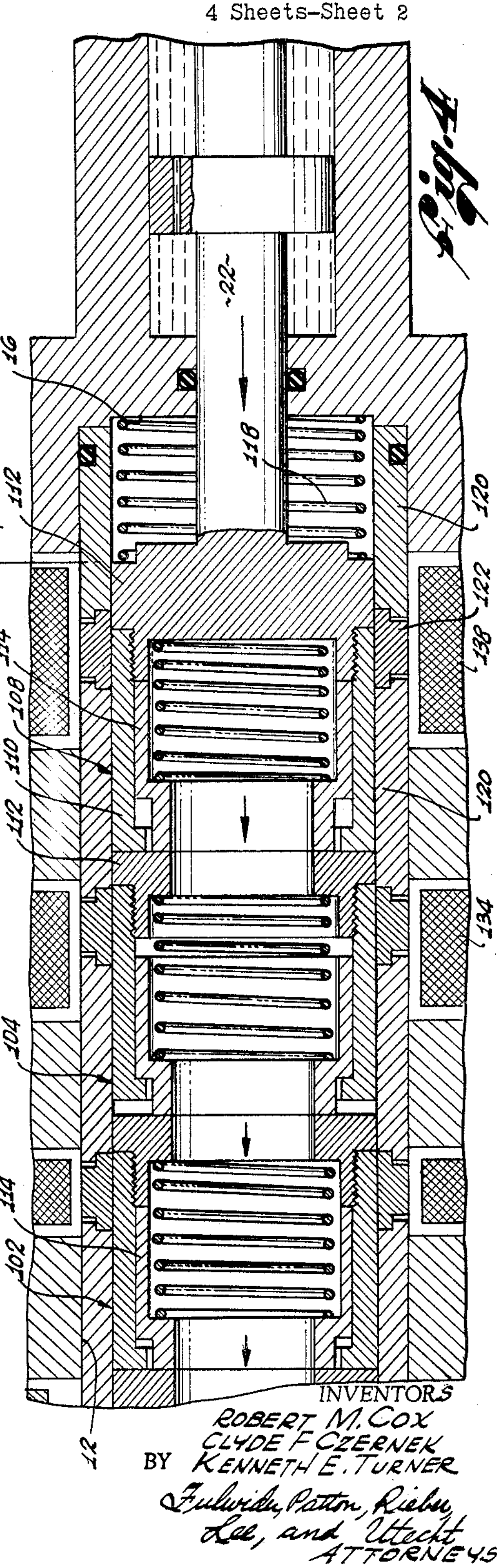

As best observed in FIGURES 1, 3 and 4, the actuator column including the piston adder assemblies 101, 102, 104 and 108 is slidably supported within the main bore 12 in a cylindrical sheath which comprises a plurality of cylindrical sections in the form of alternating sleeves 120 and slugs 122. The purpose of these sleeves 120 and slugs 122 is to shape and concentrate the magnetic fields selectively generated by solenoid coils 131, 132, 134 and 138 for each of the adder assemblies 101, 102, 104 and 108, respectively.

Each of the solenoid coils 131, 132, 134 and 138 are substantially identical, except for their physical size and current carrying capability since the air gaps in the magnetic paths of the various adder assemblies vary depending upon the magnitude of the particular digital displacement represented by a particular assembly. The solenoid coils are coaxial with the main bore 12 and are mounted in any appropriate manner within slots 140 defined in the main block 10. Adjacent solenoid coils are spaced apart by spacer sleeves 142 fabricated of any suitable ferromagnetic material such as mild steel or the like.

When any particular solenoid coil is energized by applying an appropriate electrical signal to its digital input command terminals (FIGURE 1), the particular solenoid generates an essentially axial electromagnetic field. The purpose of this field is to electromagnetically retract the plunger 114 of the adder assembly which is surrounded by the energized solenoid coil, i.e., to bring the leading end face 114*c* of the plunger into abutment with the face 112*a* of the end cap 112 and thereby close the gap between these two elements. In order to perform this function efficiently, it is necessary to direct the magnetic field generated by the solenoid so that is passes through the plunger 114 and end cap 112 and is concentrated in the air gap between these elements. In this regard, both the plunger 114 and the end cap 112 are fabricated of magnetic material. Furthermore, in order to provide a proper path for the magnetic flux, the sleeves 120 and 142 are also fabricated of magnetic material, whereas the adder assembly sleeves 110 and outer cylindrical slugs 122 are fabricated of essentially non-magnetic material.

An outer magnetic sleeve 144, coaxial with the longitudinal axis of the actuator column, surrounds the outer perimeter of the solenoid slots 140 and the spacer sleeves 142, to complete the flux paths for the magnetic fields set up by energized solenoid coils.

In order to further increase the concentration of magnetic flux across the gap between the plunger 114 and end cap 112 in each adder assembly, the outer non-magnetic cylindrical slug 122 is located substantially in overlying relation to the gap so that there is no low reluctance magnetic path bypassing the gap. The magnetic circuit defining the primary path for the magnetic flux generated by an energized solenoid coil is illustarted for the solenoid coil 138 and adder assembly 108 in FIGURE 1 by means of solid arrows.

Referring now more particularly to FIGURES 3 and 4 of the drawings, the manner in which individual adder assemblies are selectively collapsed, and follow-up movement of the actuator column and load mass is accomplished, will be apparent.

In FIGURE 3, the solenoid coil 138 has been energized to set up a magnetic field which magnetically retracts the plunger 114 of the adder assembly 108 until the plunger face 114*c* is brought into abutment with the end cap face 112*a*. In this connection, the strength of the magnetic field across the gap between the plunger 114 and the end cap 112 must be sufficient to retract the plunger against the axial forces of the spring 116 which tend to hold the adder assembly in the expanded state. However, the magnetic field produced by the solenoid coil retracts only the plunger 114 and does not move the remainder of the actuator column or the load mass.

Like contraction of the adder assembly 102 in FIGURE 3 has been accomplished by energizing the solenoid coil 132.

In FIGURE 4, contraction of each of the adder assemblies 102 and 108 has been followed up by displacement of the actuator column and output shaft 22 under the influence of the coil spring 118 which constantly exerts a biasing force against the column. It will be appreciated that the load mass (not shown) connected to the output shaft 22 is likewise displaced in accordance with the real value of the digital input command "10" represented by the sum of the digital commands "2" and "8" to the piston adder assemblies 102 and 108, respectively.

It will be apparent that the spring 118 does the bulk of the work accomplished by the digital actuation system when selected adder assemblies are collapsed. In this regard, each of the solenoid coils is limited to performing only the amount of work necessary to collapse its associated piston adder assembly. Hence, the solenoid coil current characteristic for collapse of an adder assembly consists essentially of a very brief high current spike, typically of 5 or 10 milliseconds duration, followed by a relatively low current level for holding the particular adder assembly in the collapsed state. Follow-up adjustment of the remainder of the system mass, including the load, is accomplished solely by the coil spring 118 and may typically require 70 milliseconds to reach equilibrium.

Expansion of individual piston adder assemblies is accomplished simply by de-energizing the particular solenoid coils holding the corresponding adder assemblies in the collapsed state. Upon de-energization of a solenoid coil, the plunger 114 of the adder assembly associated with the particular solenoid coil will again move away from the end cap face 112*a*, under the influence of the coil spring 116, to expand the adder assembly and displace all of the remaining adder assemblies ahead of the newly expanded assembly. Here again, the work done in moving the system mass, including the load, is accomplished not by the solenoid coil, but rather by the coil spring 116. Since the axial force exerted by each of the springs 116 exceeds the axial force exerted by the spring 118, the spring 118 does not prevent expansion of any piston adder assembly after the solenoid coil for that particular adder assembly has been de-energized.

Referring now more particularly to FIGURES 1 and 2, it is observed that the actuator includes damping means in the form of a piston 146 carried by the output shaft 22 and moving with the shaft along a fluid-filled chamber 148 defined within the block 10 on the opposite side of the end wall 20. In the embodiment of the actuator shown in FIGURES 1 and 2, and by way of example only, the piston 146 is formed as an integral, enlarged portion of the output shaft 22.

The chamber 148 is typically filled with hydraulic fluid such as oil, although an appropriate gas such as air may be employed. The piston 146 is in sliding engagement with the interior cylindrical surface of the chamber 148 and includes a small orifice 150 providing a restricted flow path for fluids passing through the piston. Hence, movement of the output shaft 22 is effectively damped to avoid excessive acceleration or deceleration of the actuator column and load mass by limiting the absolute velocity that the column and load mass can attain.

The output shaft 22 exits from the chamber 148 through a cylindrical passage 24 provided in an end wall 26 of the block 10. An appropriate sealing ring 28 prevents the escape of fluid from the chamber 148. While a similar sealing ring 30 is shown in FIGURE 1 to prevent escape of fluid from the chamber 148 through the passage 18 to the main bore 12, this is by way of illustration only, and it is to be understood that the main bore 12 may contain an appropriate fluid medium which is the same or a different medium than that contained within the chamber 148, depending upon the particular kinetic performance desired.

Referring now again to FIGURE 1 of the drawings, a cylindrical expansion sleeve 152 surrounds the magnetic sleeve 144 and is coextensive therewith, so that the expansion sleeve extends between the rear and forward portions of the block 10. The purpose of the expansion sleeve is to compensate the overall digital actuator structure, and particularly the block 10, for thermal stresses and displacement errors induced by differences in temperature between the outer surface of the block and the interior of the block, e.g., in the region of the main bore 12 where the actuator column is located. In this connection, during normal operation of the digital actuator, the temperatures will usually be higher at the center of the block 10 than outside the block, with the result that the center of the actuator will tend to thermally expand at a greater rate than the outer portions of the structural assembly. By utilizing an expansion sleeve 152 which has a higher coefficient of expansion than the average coefficient for the materials at the center of the block 10, substantial compensation for the differences in thermal expansion between the outer and inner portions of the block is provided. The expansion sleeve 152 may typically be fabricated of stainless steel or the like when the block 10 is fabricated of main steel.

In order to further stabilize the thermal characteristics of the digital actuator shown in FIGURE 1, an optional, heat insulating sleeve 154, typically of plastic or the like, may be installed around the expansion sleeve 152. The heat insulating sleeve 154 minimizes heat exchange between the digital actuator and its surrounding environment, thus encouraging a more uniform temperature profile for the actuator assembly cross section.

Figure 5:
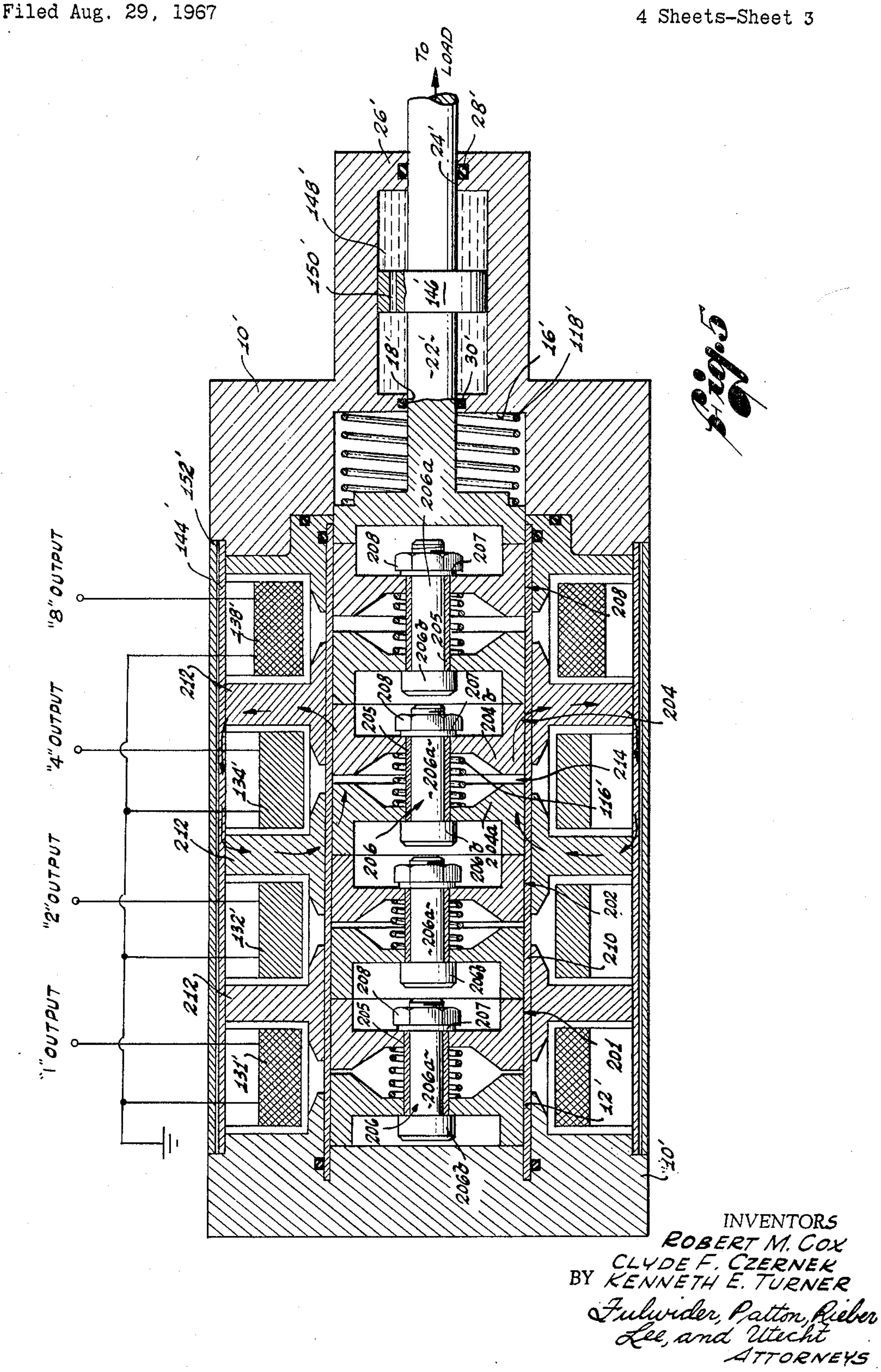
FIGURE 5 is a longitudinal sectional view of an alternate embodiment of a digital actuator embodying the invention.

Referring now more particularly to FIGURE 5 of the drawings, there is shown an alternate embodiment of a digital actuator incorporating features of the present invention. The diigtal actuator of FIGURE 5 duplicates much of the structure of the actuator shown in FIGURE 1 and, in this regard, like primed reference characters in FIGURE 5 designate like or corresponding parts represented by the unprimed reference characters in the embodiment of the digital actuator shown in FIGURE 1.

The digital actuator of FIGURE 5 differs from the actuator of FIGURE 1 primarily in the structure of the adder assemblies 201, 202, 204 and 208 in FIGURE 5.

All of the adder assemblies 201, 202, 204 and 208 are in end-to-end abutment within the bore 12′ to form a series, columnar stack arrangement and each adder assembly is capable of selective contraction and expansion to produce an incremental physical displacement of all the remaining adder assemblies ahead of its leading end proportional to the real value of the digital input quantity represented by the particular adder assembly producing the displacement. In this regard, each of the adder assemblies 201, 202, 204 and 208 is capable of producing an incremental output displacement proportional to each of the digital inputs "1," "2," "4" and "8," respectively.

The actuator column comprising the adder assemblies 201, 202, 204 and 208 is slidably supported within the main bore 12′ in a cylindrical sleeve 210 of substantially nonmagnetic material. The sleeve 210 is surrounded by spaced apart, coaxial solenoid coils 131′, 132′, 134′ and 138′ which are separated by cylindrical, ferromagnetic pole pieces 212 which also surround the sleeve and the adder assembly actuator column.

Considering the adder assembly 204, by way of example, each adder assembly comprises a pair of identical, confronting cylindrical pistons 204*a* and 204*b* which are normally held in expanded, spaced apart relatonship by a coaxial coil spring 116′ serving the same function as the coil spring 116 in the embodiment of the digital actuator shown in FIGURE 1.

The spring 116′ surrounds a sleeve 205 which in turn surrounds the shaft 206*a* of a bolt 206. The sleeve 205 and bolt shaft 206*a* extend through a central aperture provided in each of the pistons 204*a* and 204*b*, and the leading end of the shaft 206*a* is in threaded engagement with a nut 208. The sleeve 205 extends between the bolt head 206*b* and a washer 207 adjacent the nut 208. In this way, the sleeve 205 limits the degree to which the pistons 204*a* and 204*b* can be held apart by the spring 116′, i.e., the size of the digital displacement gap 214 between the two pistons is a function of the length of the sleeve between the bolts head 206*b* and the washer 207.

The bolt 206 and the nut 208 are typically fabricated of a non-magnetic material having substantially stable thermal expansion characteristics, such as titanium or the like, while the sleeve 205 is typically fabricated of a non-magnetic material having a higher thermal coefficient of expansion than the bolt and nut, such as stainless steel or the like. Normally, the bolt 206 and nut 208 are adjusted to maintain the sleeve 205 in compression at the lowest contemplated working temperature of the actuator. At higher temperatures the combined expansion of the sleeve 205, bolt 206 and nut 208 is such that thermal compensation is obtained relative to the expansion of the block 10. This is accomplished by varying the relative cross-sectional areas of the bolt 206 and sleeve 205. The result is a substantially stable digital displacement gap 214 over a relatively wide range of practical operating temperatures.

As shown in FIGURE 5, both sides of each piston 204*a* and 204*b* are appropriately recessed to provide clearance for the spring 116′, the bolt 206 and the nut 208, as well as to prevent portions of the bolt and nut from contacting the corresponding structure of adjacent adder assemblies following selective collapse of any one or all of the adder assemblies.

The digital actuator of FIGURE 5 has the advantage that all of the pistons making up the various adder assemblies 201, 202, 204 and 208 are identical, and the various adder assemblies differ from each other only in the size of the gap between the pair of pistons of a particular adder assembly when that assembly is in the expanded state.

Energization of any selected solenoid coil produces a magnetic field which draws the normally spaced apart adjacent pistons of the associated adder assembly by overcoming the axial forces of the spring 116′. In this regard, the adder assembly pistons are fabricated of any appropriate ferromagnetic material, such as cast iron or the like.

The magnetic flux path for collapse of the adder assembly 204, by way of example, is shown in solid arrows in FIGURE 5. Energization of the solenoid coil 134′ via the "4" electrical input, will establish the magnetic flux pattern shown in FIGURE 5 and close the gap 214. The coil spring 118′, corresponding to the spring 118 in the digital actuator of FIGURE 1, then brings about follow up adjustment of the actuator column with corresponding displacement of the output shaft 22′ and load mass corresponding to the real value of the digital "4" input command.

Figure 6:
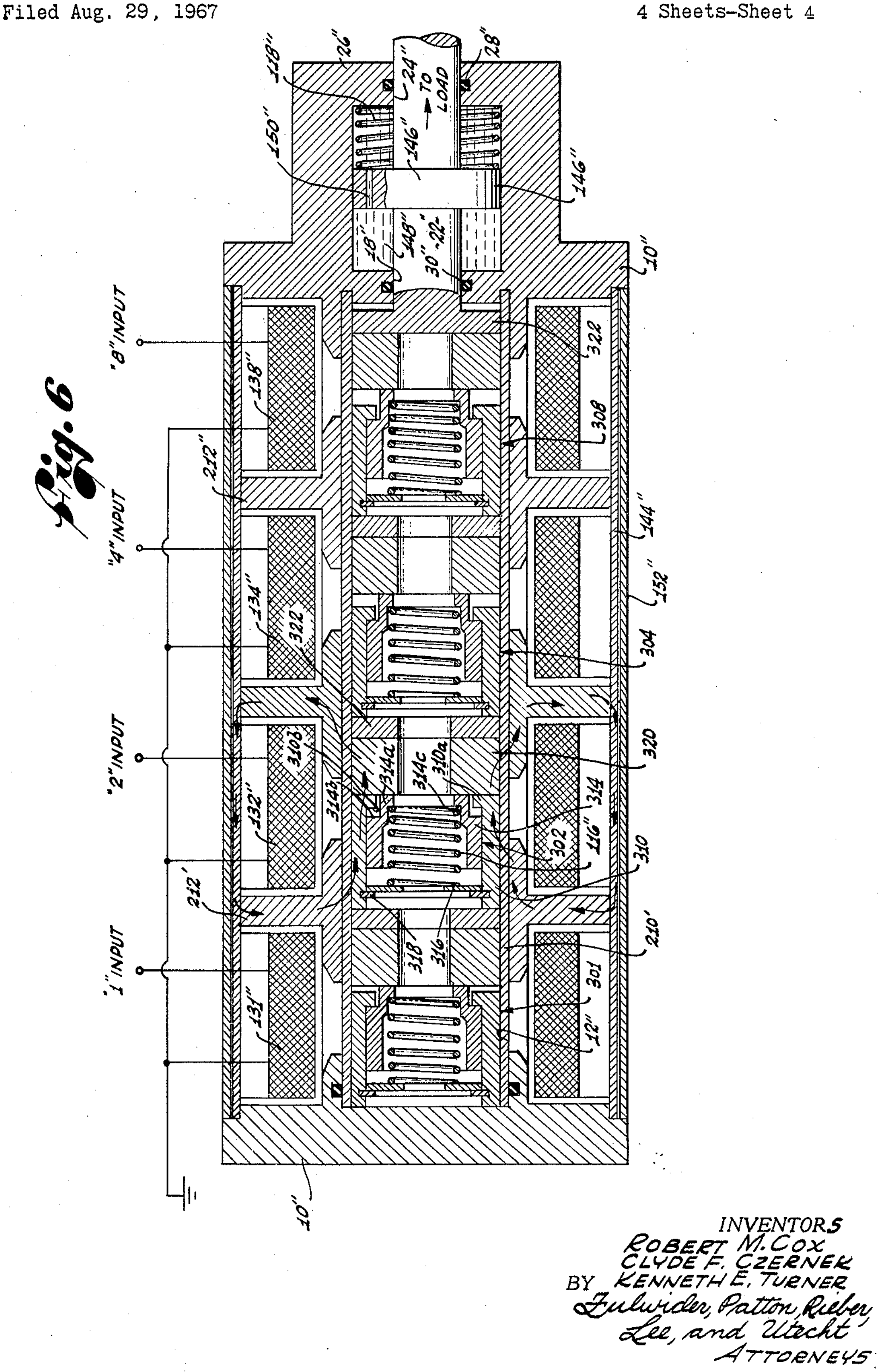
FIGURE 6 is a longitudinal sectional view through a third embodiment of a digital actuator in accordance with the invention.

Referring now more particularly to FIGURE 6 of the drawings, there is shown another embodiment of a digital actuator incorporating features of the present invention. The digital actuator of FIGURE 6 duplicates much of the structure of the actuator shown in FIGURE 5, and in this regard, like primed reference characters designate like or corresponding parts in the actuator embodiments of FIGURES 5 and 6.

The digital actuator of FIGURE 6 differs from the actuator of FIGURE 5 primarily in the structure of the adder assemblies 301, 302, 304 and 308 in FIGURE 6. All of these adder assemblies 301, 302, 304 and 308 are in end-to-end abutment within the bore 12″ to form a series, columnar actuator stack wherein each of the adder assemblies is capable of producing an incremental output displacement proportional to the digital input commands "1," "2," "4" and "8," respectively.

The actuator column comprising the adder assemblies 301, 302, 304 and 308 is slidably supported within the main bore 12″ in a cylindrical sleeve 210′ of substantially non-magnetic material. The sleeve 210′ is surrounded by solenoid coils 131″, 132″, 134″, 138″ and cylindrical pole pieces 212′ in the same manner as the corresponding structure in the digital actuator of FIGURE 5.

Considering the adder assembly 302, by way of example, each adder assembly of the actuator shown in FIGURE 6 includes an outer magnetic cylindical sleeve 310 and a cylindrical pluger 314, of substantially non-magnetic material, within the sleeve. The plunger 314 includes a reduced diameter portion 314a at its leading end which defines a shoulder 314b and further includes an inwardly directed flange at its leading end which defines a second shoulder 314c.

The sleeve 310 also includes an inwardly directed flange 310a at its leading end defining a face 310b directed towards the rear (to the left in FIGURE 6). Also mounted within the sleeve 310, near the trailing end of the sleeve, is a washer 316 backed up by a suitably seated retaining ring 318.

The plunger 314 is in sliding engagement with the sleeve 310 and is confied within the sleeve for relative movement between a projected position of the plunger, wherein the shoulder 314b abuts the flange face 310b of the sleeve, and a retracted position wherein no portion of the plunger projects beyond the leading end of the sleeve.

A coil spring 116″, which serves the same function as the springs 116 and 116′ of the actuator embodiments of FIGURES 1 and 5, respectively, extends between the plunger face 314c and the washer 316 to bias the plunger 314 into a projected position and thereby normally maintain the adder assembly 302 in he expanded state.

For displacement purposes in the piston adder actuator column, the reduced diameter portion 314a of the plunger 314 projects beyond the leading face 310c of the sleeve 310 when the adder assembly is in its expanded state. In this regard, the projected non-magnetic plunger 314 engages a spacer disc 320, of magnetic material, which is also slidably supported within the outer non-magnetic sleeve 210′. The spacer disc 320 also completes the magnetic circuit between the sleeve 310 and the adjacent pole piece 212′.

A non-magnetic disc 322 is slidably supported within the sleeve 210′ adjacent the disc 320 and serves to isolate the next adjacent adder assembly 304 from the energized magnetic circuit of the adder assembly 302.

It will be apparent from the magnetic circuit and flux path shwon in solid arrows for the energized adder assembly 302 in FIGURE 6 that relative motion between the sleeve 310 and the plunger 314 is accomplished by moving the sleeve into abutment with the magnetic disc 320.

The output displacement shaft 22″ in FIGURE 6 is connected to the last non-magnetic spacer disc 322.

After selected solenoid coils have been energized and their associated adder assemblies have been collapsed or contracted, follow up adjustment of the actuator column with corresponding displacement of the output shaft 22′ and load mass, is accomplished by the coil spring 118″ in the same manner as for the digital actuator embodiments of FIGURES 1 and 5 previously described.

It will be noted in FIGURES 6 that the coil spring 118″ is located within the damping chamber 148″ and biases the damping piston 146″, as opposed to being located directly within the main bore 12″ of the actuator. However, this is by way of example only and not by way of limitation, to illustrate alternative locations for the follow-up motive means represented by the spring 118″.

In each of the digital actuator embodiments of FIGURES 1, 5 and 6, the solenoid coils are relatively compact and need merely be capable of contracting and holding their individually associated adder assemblies, without the need for capability to move the entire system mass including the load. Hence, the actuator action is essentially accomplished in two phases, the first phase involving displacement only of individual, relatively low mass adder assemblies, with the second phase involving a slower follow up displacement of the much larger remainder of the system mass including the load.

The digital actuator devices constructed in accordance with the present invention are precise, highly reliable and durable, involve a minimum of structural complexity, and are relatively economical.

It will be apparent from the foregoing that, while particular forms of the invention have been illustrated and described, various modifications can be made without departing from the spirit and scope of the invention. Accordingly, it is not intended that the invention be limited, except as by the appended claims:

We claim:

1. In a digital actuation system, the combination comprising:

a plurality of coaxial piston adder assemblies in end-to-end abutment defining an actuator column, each of said adder assemblies including a pair of coaxial cylindrical elements of magnetic material movable relative to each other to define expanded and collapsed states for the respective adder assembly;

first resilient biasing means for each of said adder assemblies for normally maintaining the pair of cylindrical elements for a particular assembly in spaced apart relationship, the gap between said elements being proportional to the real value of a digital quantity represented by the particular adder assembly;

an output displacement shaft coupled to one end of said actuator column;

electromagnetic means for selectively overriding said first biasing means for each adder assembly to bring the cylindrical elements of a particular assembly into abutment and thereby close said gap to place the particular adder assembly in the collapsed state;

second resilient biasing means, providing a biasing force of less magnitude than the biasing force provided by said first resilient biasing means, for contracting said actuator column and moving said output shaft upon selective collapse of any of said adder assemblies; and means for thermally stabilizing the size of said gap between the elements of each adder assembly, including a bolt passing through both of said cylindrical elements and in threaded engagement with a nut, said bolt and nut being of a material having a relatively low thermal coefficient of expansion, and a sleeve surrounding said bolt and held in compression between said bolt and said nut, said sleeve being of a material having a greater thermal coefficient of expansion than said bolt and said nut.

2. In a digital actuator system, the combination comprising:

a plurality of coaxial piston adder assemblies in abutting but detached end-to-end relation forming an actuator column, each of said assemblies including a pair of coaxial elements of magnetic material movable toward and away from each other, independently of the other assemblies, to define collapsed and expanded states of each adder assembly;

first resilient biasing means for each of said adder assemblies urging the elements of the assembly apart and into said expanded position;

abutment means on each assembly limiting the expansion of the assembly by said first biasing means;

an electromagnetic coil disposed around each of said assemblies and selectively energizable to cause the elements of the assembly to be drawn together into the collapsed state, the reduction in the length of each of said assemblies upon movement to the collapsed state being proportional to the real value of one digital quantity of a selected group of different quantities represented by said assemblies;

and second resilient biasing means acting on said one end of said column in a direction to collapse the column longitudinally as permitted by the collapse of any selected number of said assemblies, thereby variably positioning said output shaft in accordance with the condition of said column, said second biasing means exerting a collapsing force less than the expanding force of each of said first biasing means so as to contract said column only to the extent that said coils have collapsed the individual assemblies;

at least one of said adder assemblies comprising an outer cylindrical sleeve of non-magnetic material having a magnetic end cap at one end and a stop at the other end, thereby to form one of said elements, a cylindrical plunger of magnetic material slidably guided within said sleeve and confined therein between said end cap and said stop to form the other of said elements, said first biasing means being a coil spring compressed between said plunger and said end cap to urge the two apart into said expanded condition, and an extension on said plunger projecting beyond said stop and the end of said sleeve into engagement with the next assembly, said plunger being positioned by said stop to determine said expanded condition, and being retracted away from said stop toward said end cap to determine said collapsed condition.

3. A combination as set forth in claim 2 in which said plunger extension is fully withdrawn into said sleeve in said collapsed condition, whereby the digital quantity is represented by the amount of projection of said extension beyond said sleeve.

4. A combination as set forth in claim 3 in which said stop is an inturned flange on said other end of said sleeve, and said member is a reduced diameter portion of said plunger projecting out through said flange.

5. A combination as set forth in claim 3 in which said plunger and said end cap have opposed end surfaces within said sleeve that are spaced apart, in said expanded condition, a distance at least as great as the projection of said extension beyond said sleeve.

6. In a digital actuator system, the combination comprising:

a plurality of coaxial piston adder assemblies in abutting but detached end-to-end relation forming an actuator column, each of said assemblies including a pair of coaxial elements of magnetic material movable toward and away from each other, independently of the other assemblies, to define collapsed and expanded states of each adder assembly;

first resilient biasing means for each of said adder assemblies urging the elements of the assembly apart and into said expanded position;

abutment means on each assembly limiting the expansion of the assembly by said first biasing means;

an electromagnetic coil disposed around each of said assemblies and selectively energizable to cause the elements of the assembly to be drawn together into the collapsed state, the reduction in the length of each of said assemblies upon movement to the collapsed state being proportional to the real value of one digital quantity of a selected group of different quantities represented by said assemblies;

and second resilient biasing means acting on said one end of said column in a direction to collapse the column longitudinally as permitted by the collapse of any selected number of said assemblies, thereby variably positioning said output shaft in accordance with the condition of said column, said second biasing means exerting a collapsing force less than the expanding force of each of said first biasing means so as to contract said column only to the extent that said coils have collapsed the individual assemblies;

at least one of said adder assemblies comprising a pair of cylindrical elements having adjacent end surfaces disposed in spaced apart relation to define a gap of selected width between said surfaces, a bolt passing through both of said elements and having a head on one end abutting against the remote end of one element and a nut on the other end abutting against the romote end of the other element, said head and said nut being recessed into said remote ends to avoid interference with adjacent assemblies, and said bolt and said nut being composed of a first material having a relatively low thermal coefficient of expansion, and a sleeve telescoped over said bolt inside said spring and held in compression between the bolt and the nut, the sleeve being composed of a second material having a substantially greater thermal coefficient of expansion than said bolt and said nut, thereby to thermally stabilize the size of said gap, said first biasing means being a coil spring disposed around said bolt between said elements to hold the latter yieldably in the expanded condition in engagement with said nut and said bolt while permitting the elements to come together to said collapsed condition.

7. In a digital actuator system, the combination comprising:

a plurality of coaxial piston adder assemblies in abutting but detached end-to-end relation forming an actuator column, each of said assemblies including a pair of coaxial elements of magnetic material movable toward and away from each other, independently of the other assemblies, to define collapsed and expanded states of each adder assembly;

first resilient biasing means for each of said adder assemblies urging the elements of the assembly apart and into said expanded position;

abutment means on each assembly limiting the expansion of the assembly by said first biasing means;

an electromagnetic coil disposed around each of said assemblies and selectively energizable to cause the elements of the assembly to be drawn together into the collapsed state, the reduction in the length of each of said assemblies upon movement to the collapsed state being proportional to the real value of one digital quantity of a selected group of different quantities represented by said assemblies;

and second resilient biasing means acting on said one end of said column in a direction to collapse the column longitudinally as permitted by the collapse of any selected number of said assemblies, thereby variably positioning said output shaft in accordance with the condition of said column, said second biasing means exerting a collapsing force less than the expaning force of each of said first biasing means so as to contract said column only to the extent that said coils have collapsed the individual assemblies;

at least one of said adder assemblies comprising an outer cylindrical sleeve of magnetic material having first and second stops in its opposite ends and forming one of said elements, a cylindrical plunger of non-magnetic material slidably guided within said sleeve for back-and-forth movement between said stops and including an extension member projecting beyond said first stop and beyond one end of said sleeve by a preselected amount when the plunger is in engagement with said first stop, said first biasing means being a coil spring compressed between said second stop and said plunger to urge the latter yieldably toward said first stop, and a disk of magnetic material positioned adjacent said one end of said sleeve for engagement with said member in said expanded condition and with said one end when said plunger is retracted into said sleeve.

8. A combination as set forth in claim 7 in which said first stop is an inwardly directed flange within said one end.

9. A combination as set forth in claim 7 in which said second stop is a washer releasably retained in the other end of said sleeve.

10. A combination as set forth in claim 8 in which said member is a reduced diameter portion of said plunger defining a shoulder engageable with said stop flange, said reduced diameter portion projecting through and beyond the flange to engage said disk.

References Cited

UNITED STATES PATENTS

| | | | |
|---|---|---|---|
| 3,325,757 | 6/1967 | Gang | 335—217 |
| 3,299,302 | 1/1967 | Frisch | 310—14 XR |
| 3,219,854 | 11/1965 | McLaughlin | 335—267 XR |
| 3,017,546 | 1/1962 | Bates | 335—268 XR |
| 2,935,663 | 5/1960 | Pollak | 335—259 |

FOREIGN PATENTS

| | | |
|---|---|---|
| 403,024 | 6/1966 | Switzerland. |

G. HARRIS, Primary Examiner

DEWITT M. MORGAN, Assistant Examiner

U.S. Cl. X.R.

335—268